United States Patent [19]

Croy et al.

[11] 4,381,868
[45] May 3, 1983

[54] PRESSURE-ACTUATED WELLHEAD SEALING ASSEMBLY

[75] Inventors: David G. Croy; Lee M. Hollingsworth; Leonard E. Williams, Jr.; Richard D. Jolly; Mark C. Tate, all of Houston, Tex.

[73] Assignee: Cameron Iron Works, Inc., Houston, Tex.

[21] Appl. No.: 286,379

[22] Filed: Jul. 24, 1981

[51] Int. Cl.³ .................. E21B 33/12; F16J 15/48
[52] U.S. Cl. ............................ 277/27; 277/31; 277/103; 277/111; 277/188 R; 166/88; 166/83; 285/140; 285/142; 285/147; 277/DIG. 6
[58] Field of Search ............... 277/3, 27, 30, 31, 103, 277/110-114, 116.2, 188 R, 188 A, 189, DIG. 6; 285/140, 142, 143, 146-148; 166/88, 89, 82, 83

[56] References Cited

U.S. PATENT DOCUMENTS

| | | | |
|---|---|---|---|
| 2,737,248 | 3/1956 | Baker | 285/147 X |
| 3,288,493 | 11/1966 | Brown | 285/140 X |
| 3,311,168 | 3/1967 | Pierce | 285/140 X |
| 3,809,158 | 5/1974 | Bonds et al. | 285/142 X |
| 4,078,832 | 3/1978 | Wittman | 277/3 X |
| 4,082,298 | 4/1978 | Sanford | 277/103 X |

FOREIGN PATENT DOCUMENTS 510587  9/1920  France .................. 277/3

Primary Examiner—Robert S. Ward, Jr.
Attorney, Agent, or Firm—Vinson & Elkins

[57] ABSTRACT

An improved heat resistant seal assembly for sealing across an annular recess between the interior of a wellhead member and the exterior of a tubular member including a heat resistant seal ring in the recess, a pressure responsive ring for moving the seal ring into sealing position in the recess, latching means to retain the pressure responsive ring in set position and spring means between the seal ring and the pressure responsive ring to maintain a sealing force on the seal ring.

13 Claims, 4 Drawing Figures

PRESSURE-ACTUATED WELLHEAD SEALING ASSEMBLY

BACKGROUND

Offshore production platforms have closely spaced wellheads thereon. Such spacing may be $7\frac{1}{2}$ to 10 foot center-to-center. The danger of a fire on such a platform is serious and the seals between the wellhead and the casing hanger have not generally been capable of withstanding the temperatures generated by an adjacent fire for a period of time sufficient to ensure that all of the subsurface safety valves have been closed to prevent release of fluids from the wellhead which would further fuel the fire. Additionally, in many applications the stem seal on a valve fails when close to a fire and allows fluids to escape which may further feed the fire.

Materials, such as Grafoil (a registered trademark of Union Carbide Corporation), have been developed which can provide a seal when exposed to high temperatures for a reasonable period of time. One form of such material is shown in U.S. Pat. No. 4,256,317. A casing hanger seal assembly, which is actuated by a piston, is suggested by U.S. Pat. No. 3,561,527. Spring loading of a seal assembly is shown in U.S. Pat. No. 4,160,551, which patent also discloses the use of alternate layers of graphite and spring metal as the sealing elements of a seal assembly. U.S. Pat. No. 1,324,775 discloses a piston actuated packing gland for sealing around a piston rod with springs positioned between the piston and the packing rings. The packing rings are hollow and wedge-shaped and have hollow, oppositely positioned wedge-shaped metal rings between each packing ring. The metal rings support the packing rings and the inter-engaging wedge shapes urge the packing rings inward against the piston rod.

None of the known prior art provides a seal assembly which, when subjected to an external fire, will provide an effective seal for sufficient time to ensure that the fluids contained by the seal assembly are not released to fuel the fire.

SUMMARY

The present invention provides an improved seal assembly which is heat resistant and includes a heat resistant seal, spring means loading the seal, pressure responsive means for setting the seal and latch means to hold the seal in set position.

An object of the present invention is to provide an improved seal assembly which can maintain its fluid tight seal when exposed to high temperatures for a period sufficiently long to ensure that any leakage past the seals is prevented by shutting off the source of fluid which is sealed by such assembly.

Another object of the present invention is to provide an improved seal assembly for a tubing hanger which will maintain a fluid-tight seal for a period of at least one hour when it is subjected to temperatures of 1250° F.

A further object is to provide an improved seal assembly which will withstand high temperatures and which ensures an ambient temperature fluid-tight seal at all times after the pressure setting of the seal assembly.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
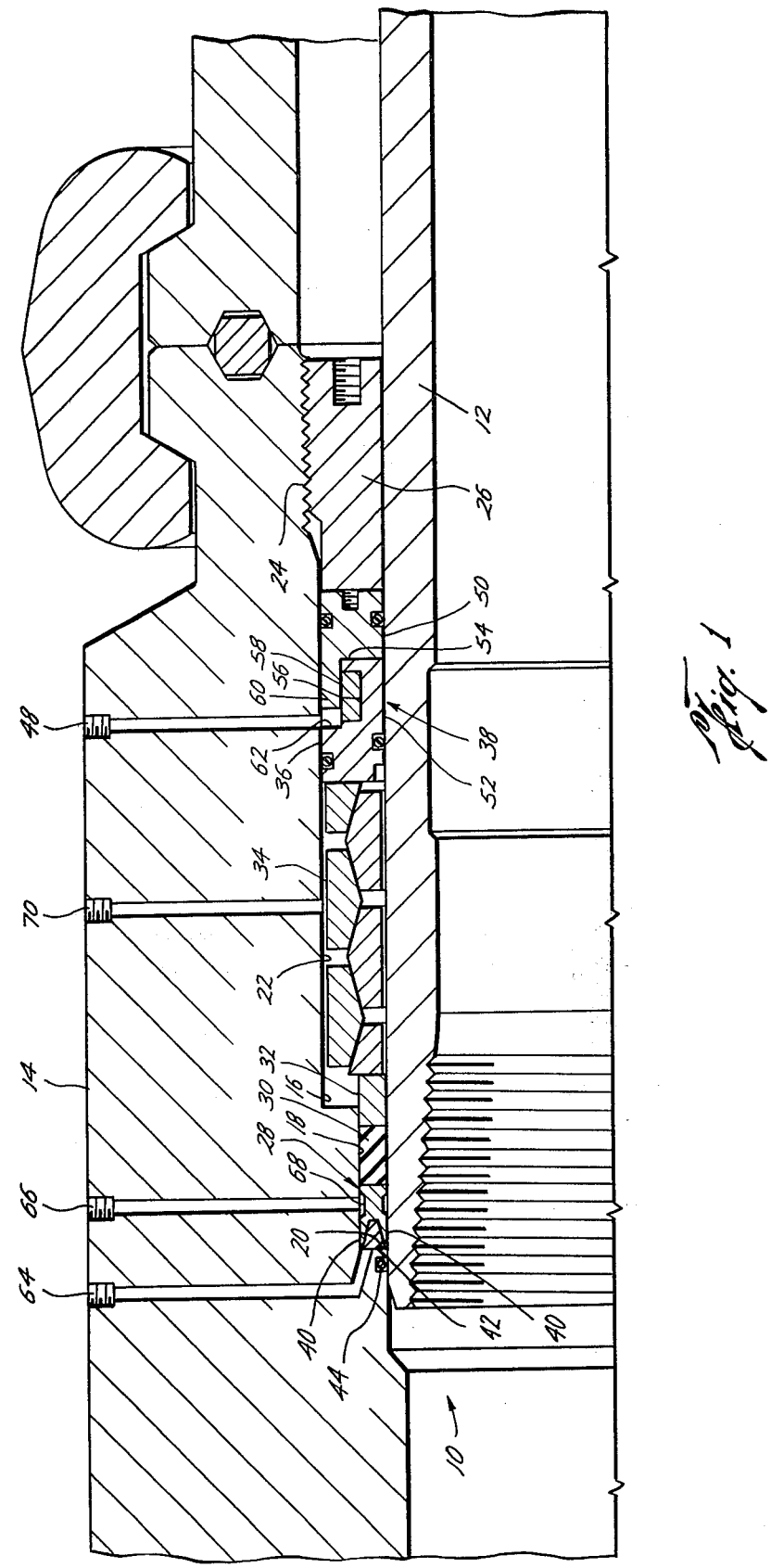
FIG. 1 is a partial sectional view of the improved seal assembly of the present invention installed as a tubing hanger seal in a wellhead.
Figure 2:
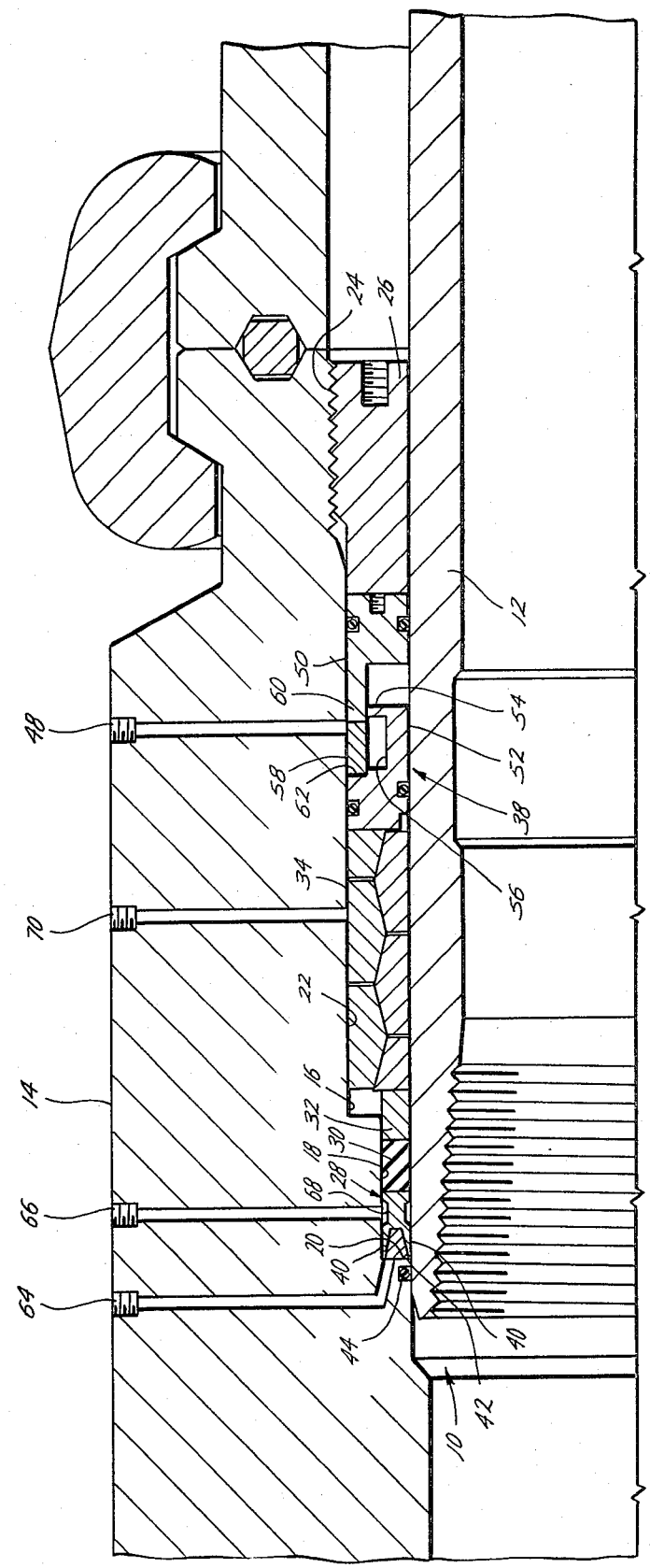
FIG. 2 is a view of the seal assembly shown in FIG. 1 but showing the seal assembly in set position.

Seal assembly 10 is shown in FIGS. 1 and 2 providing a normal temperature seal and a high temperature seal for sealing between tubing hanger 12 and wellhead member 14. Recess 16 in wellhead member 14 provides the space in which seal assembly 10 is positioned to seal between the exterior of tubing hanger 12 and the interior of wellhead member 14. Recess 16 has upper portion 18 adjacent downward facing shoulder 20 and has an outer diameter less than the outer diameter of the lower portion 22. Threads 24 are provided on wellhead member 14 to receive loading ring 26 and is threaded therein to provide the lower abutment for seal assembly 10.

Seal assembly 10 includes seal ring 28, heat resistant seal ring 30, driver ring 32, ring spring 34 having a plurality of rings as shown, piston 36 and latch means 38. Seal ring 28 includes inner and outer lips 40 with spreader ring 42 between lips 40 and abutting shoulder 20 as shown. When properly set, seal ring 30 provides an initial seal and seal ring 28 may be eliminated, provided that seal ring 30 has a suitable shoulder against which it abuts in sealing. Ring spring 34 provides the spring means between the pressure responsive ring 36 and the seal rings 28 and 30 biasing the seal rings toward set position. O-ring 44 in the upper interior of wellhead member 14 seals around the exterior of hanger 12 above seal assembly 10. Seal ring 30 is positioned in upper portion 18 of recess 16 and engages the lower edge of seal ring 28. Driver ring 32 engages the lower edge of seal ring 30 and is urged upwardly by ring spring 34. The load of ring spring 34 is set by the position of loading ring 26 in threads 24 which preload seal rings 28 and 30 with pressure responsive means, such as pressure responsive ring or piston 36, in its lower position.

Piston 36 is responsive to fluid under pressure conducted through port 48 in wellhead member 14 to a position between piston 36 and base ring 50. Piston 36 has an upper annular portion with seals for sealing between the interior of wellhead member 14 in recess 16 and the exterior of hanger 12, neck 52 extending downward and outwardly extending flange 54 which forms three sides of annular recess 56 into which split latch ring 58 is compressed, with piston 36 in its lower position. Base ring 50 is annular in shape and includes suitable seals and outer, upwardly extending lip 60 which provides the outer side of recess 56 to retain latch ring 58 in recess 56.

Latch means is provided to retain piston 36 in its abutted position as shown in FIG. 2 and hereinafter described. When piston 36 moves upward responsive to fluid pressure conducted through port 48, the upward movement of piston 36 moves latch ring 58 upwardly from under lip 60 and latch ring 58 moves outward to its relaxed position to lock piston 36 in its upper position.

In this position, latch ring 58 engages the upper end of lip 60 and downwardly facing shoulder 62 on piston 36.

The upward movement of piston 36 further compresses ring spring 34 which forces driver ring 32 upward, setting seal ring 30 and forcing it upward against seal ring 28 so that spreader ring 42 is forced further within lips 40 to assure that they seal both against the interior of wellhead member 14 and the exterior of hanger 12. The compression loading of seal ring 30 between seal ring 28 and driver ring 32 forces it into sealing engagement between wellhead member 14 and hanger 12.

Seal ring 28 and spreader ring 42 are made preferably, from a 300 series stainless steel with silver plating. Seal ring 30 is made from a suitable material which will maintain the seal even when temperatures at seal assembly 10 reach a temperature of 1250° F. A material which has such characteristics is a graphite packing material sold under the trademark "Grafoil" by Union Carbide Corporation (U.S. Pat. No. 3,404,061). Ring spring 34 is preferably made of a material sold by International Nickel Company under the trademark Inconel 718. The seal rings in piston 36 and base ring 50 are of a material such as is sold by Parker Hannafin Company under the trademark Molythane. Latch ring 58 is preferably of a 4140 steel.

Port 64 extends through wellhead member 14 and communicates with recess 16 in shoulder 20. Port 66 extends through wellhead 14 to communicate with annular recess 68 in seal ring 28. Port 70 extends through wellhead 14 to communicate with recess 16 in the area in which ring spring 34 is positioned.

With the seals set by actuation of piston 36, the pressure is released, the connection supplying pressure to port 48 removed and a feeler inserted through port 48 to determine that piston 36 has moved sufficiently to release latch ring 58 which in its latched position covers the inner end of port 48 so that the feeler cannot pass into the space between shoulder 62 and the end of lip 60. To ensure that seal ring 28 is sealing effectively, pressure is supplied to port 64 and port 66 is tested for leakage. To test whether the sealing of seal ring 30 is effective, pressure is applied through port 66 and port 70 is checked for leakage.

Figure 3:
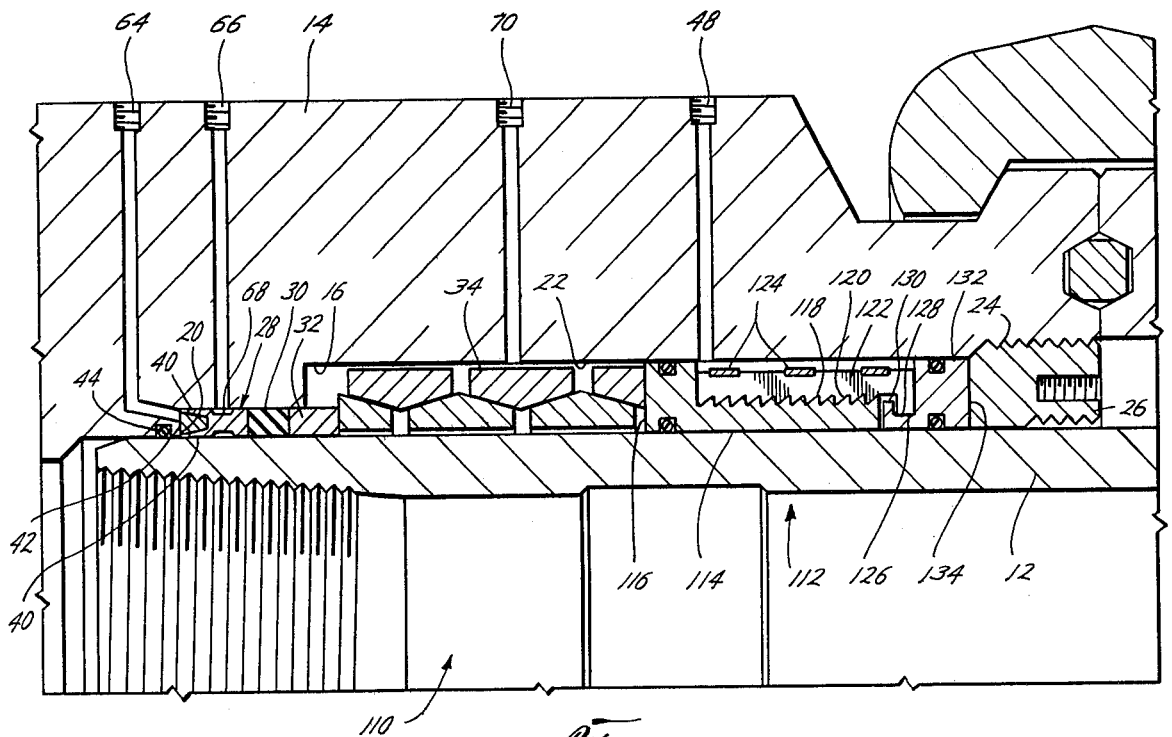
FIG. 3 is another partial sectional view of a modified form of the improved seal assembly of the present invention.
Figure 4:
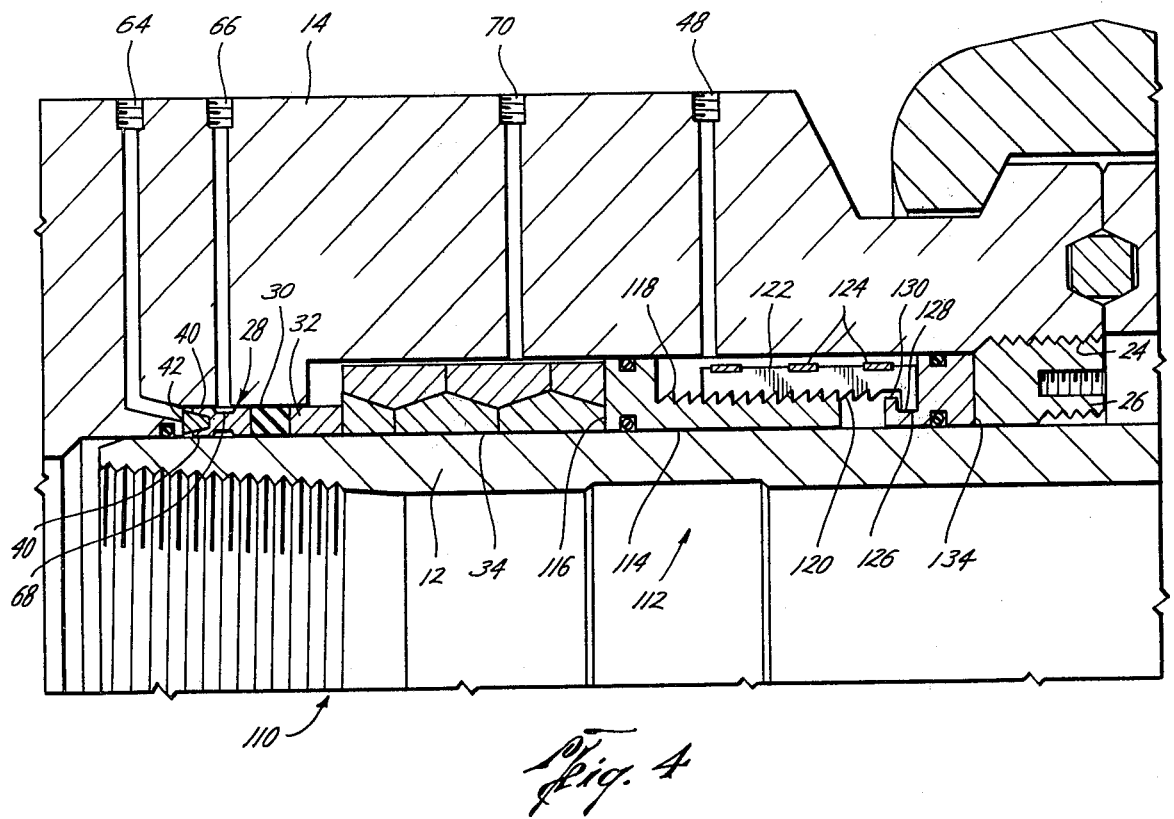
FIG. 4 is a view of the seal assembly shown in FIG. 3 shown in set position.

A modified form of the improved seal assembly of the present invention is shown in FIG. 3. Modified seal assembly 110 is identical to seal assembly 10 (and like parts are given the same number) except that the structure of latch means 112 is different from the structure of latch means 38. Latch means 112 includes neck 114 of piston 116 which has external teeth 118, latch segments 120 which have internal teeth 122 mating with teeth 118, and springs 124 urging segments 120 upwardly. Each segment 120 has an inwardly extending lip 126 which engages in recess 128 between lip 130 and body 132 of base ring 134. Teeth 116 and 120 have a tapered face and a radial face as shown so that actuation of piston 114 causes relative movement between neck 112 and segments 118 with segments 118 being cammed outward by the tapered side of the engaging teeth until movement of piston 114 stops and then segments 118 move inward to the position shown in FIG. 4 with the radial faces in engagement to prevent return movement of piston 114 after the pressure thereon has been released. A similar type of latch or ratchet means used with a seal assembly to retain the seal ring in different expanded positions in response to a force applied downwardly thereto. The seals in the modified form are set as previously described with respect to the form shown in FIGS. 1 and 2.

What is claimed is:

1. A seal assembly for sealing across an annular recess between the interior of a wellhead member and the exterior of a tubular member comprising
   a heat resistant seal ring positioned in said recess,
   a pressure responsive ring positioned in said recess,
   means for conducting a fluid under pressure to said pressure responsive ring,
   said pressure responsive ring, when actuated by fluid pressure supplied through said conducting means, moving said seal ring to set position,
   means for latching said pressure responsive ring in set position, and
   spring means between said pressure responsive ring and said seal ring to maintain a sealing force on said seal ring after actuation and latching of said pressure responsive ring.

2. A wellhead seal according to claim 1 including a second seal ring positioned in said recess.

3. A seal assembly according to claim 1 wherein said latch means includes
   a latch ring, and
   means coacting with said pressure responsive ring in its unactuated position to retain said latch ring in unlatched position and releasing said latch ring, following completion of movement of said pressure responsive ring to actuated position, to move to latched position retaining said pressure responsive means in actuated position.

4. A seal assembly according to claim 3 wherein said latch ring is positioned in a recess defined on three sides by said pressure responsive ring and a lip projecting over said recess when said pressure responsive ring is in unactuated position,
   the recess in said pressure responsive ring moving free of said lip to allow latching movement of said latch ring.

5. A seal assembly according to claim 1 wherein said latch means includes
   a neck on said pressure responsive ring having teeth thereon with tapered faces and radial faces,
   a plurality of segments with teeth mating with the neck teeth,
   spring means biasing said teeth of said segments into engagement with said neck teeth, and
   means preventing movement of said segments when said pressure responsive ring is moved to actuated position,
   the tapers on said teeth camming said segments out of engagement with said neck when said pressure responsive ring moves and returning to engagement to retain said pressure responsive ring and said seal rings in set position.

6. A seal assembly according to claim 1 wherein said recess is on the interior of said wellhead member.

7. A seal assembly for sealing between two concentric cylindrical members wherein one of said members has an annular recess for receiving said seal assembly for sealably engaging the other member, comprising
   a heat resistant seal ring positioned in said recess,
   a pressure responsive ring positioned in said recess,
   spring means in a space between said rings and engaging the rings,
   fluid pressure means for urging said pressure responsive ring toward the seal ring, compressing the spring and setting the seal ring, and latch means for holding the pressure responsive ring in actuated position.

8. A seal assembly according to claim 7 wherein the seal assembly also comprises
a second seal ring particularly suitable for normal temperature, said second seal ring being positioned near said heat resistant seal ring for setting simultaneously therewith.

9. A seal assembly according to claim 7 wherein said latching means includes
a latch ring, and
means coacting with said pressure responsive ring in its unactuated position to retain said latch ring in unlatched position and releasing said latch ring following completion of movement of said pressure responsive ring to actuated position to move to latched position retaining said responsive means in actuated position.

10. A seal assembly according to claim 9 wherein said latch ring is positioned in a recess defined on three sides by said pressure responsive ring and a lip projecting over said recess when said pressure responsive ring is in unactuated position,
the recess in said pressure responsive ring moving free of said lip to allow latching movement of said latch ring.

11. A seal assembly according to claim 7 wherein said latch means includes
a neck on said pressure responsive ring having teeth thereon with tapered faces and radial faces,
a plurality of segments with teeth mating with the neck teeth,
spring means biasing said teeth of said segments into engagement with said neck teeth, and
means preventing movement of said segments when said pressure responsive ring is moved to actuated position,
the tapers on said teeth camming said segments out of engagement with said neck when said pressure responsive ring moves and returning to engagement to retain said pressure responsive ring and said seal rings in set position.

12. A wellhead seal assembly for high temperature sealing comprising
an annular wellhead member,
a tubular member positioned within said wellhead,
an annular recess in said wellhead,
a first seal ring positioned in said recess and having inner and outer diverging flanges extending in a direction opposite the direction in which pressure is exerted thereon,
a spreader ring positioned between said flanges and shutting one end of said recess,
a second seal ring being heat resistant to maintain its seal when exposed to high temperature and positioned in said recess in abutting end to end relation to said first seal ring,
a driver ring in said recess abutting the other end of said second seal ring,
a plurality of spring rings in said recess positioned in engaging relationship to each other and one of said spring rings abutting the end of said driver ring away from said second seal ring,
an annular piston having an outwardly facing recess and positioned in said annular recess in abutment with the one of said spring rings away from said driver ring,
a base ring in said annular recess having an outer flange at least partially covering said outwardly facing recess in said piston when said piston is abutting said base ring,
a latch ring in said outwardly facing recess,
said latch ring being biased to move to a diameter larger than said outwardly facing recess when free to move,
a setting ring threaded to one of said wellhead and said tubular member and abutting said base ring so that said assembly may be initially loaded,
a passage communicating with the annular recess between said piston and said base ring,
fluid pressure supplied to said passage actuating said piston away from said base ring to complete setting of said seal rings and loading said spring ring,
said piston during actuation moves a sufficient distance to move said latch ring out from said outer flange of said base ring whereby said latch ring expands to prevent return movement of said piston toward said base ring.

13. A seal assembly for sealing between two concentric cylindrical members wherein one of said members has an annular recess for receiving said seal assembly for sealably engaging said other member, comprising
a heat resistant seal ring positioned in said recess,
spring means in the recess urging the seal ring toward set position,
pressure responsive means for compressing the spring and setting the seal ring, and
means for retaining the seal ring in set position.

* * * * *

UNITED STATES PATENT AND TRADEMARK OFFICE
CERTIFICATE OF CORRECTION

PATENT NO. : 4,381,868

DATED : May 3, 1983

INVENTOR(S) : David G. Croy, Lee M. Hollingsworth; Leonard E. Williams, Jr.

It is certified that error appears in the above—identified patent and that said Letters Patent is hereby corrected as shown below:

```
    Column 3, line 56, change "116" to "118";
    Column 3, line 58, change "114" to "116";
    Column 3, line 58, change "112" to "114";
    Column 3, line 59, change "118" to "120", both occurrences;
    Column 3, line 61, change "114" to "116"; change "118" to
"120";
    Column 3, line 64, change "114" to "116".
```

Signed and Sealed this

Twenty-second Day of April 1986

[SEAL]

Attest:

DONALD J. QUIGG

Attesting Officer

Commissioner of Patents and Trademarks